United States Patent [19]
Akitake et al.

[11] Patent Number: 4,728,979
[45] Date of Patent: Mar. 1, 1988

[54] APPARATUS FOR EXPOSURE CONTROL/FOCUS ADJUSTMENT FOR CAMERA

[75] Inventors: Hiroshi Akitake; Toshimasa Akagi; Gouichi Hiratsuka, all of Hachioji; Tatsuya Suzuki, Choufu, all of Japan

[73] Assignee: Olympus Optical Company, Ltd., Tokyo, Japan

[21] Appl. No.: 923,293

[22] Filed: Oct. 27, 1986

[30] Foreign Application Priority Data
Nov. 2, 1985 [JP] Japan .................... 60-246825

[51] Int. Cl.⁴ .................... G03B 3/00; G03B 7/087
[52] U.S. Cl. .................... 354/400; 354/402; 354/435; 354/195.1
[58] Field of Search ............ 354/400, 402, 435, 195.1

[56] References Cited
U.S. PATENT DOCUMENTS

| 4,360,258 | 11/1982 | Hashimoto | 354/435 |
| 4,426,145 | 1/1984 | Hashimoto | 354/195.1 |
| 4,572,645 | 2/1986 | Yoshida et al. | 354/435 |

FOREIGN PATENT DOCUMENTS
0093409 5/1985 Japan .

Primary Examiner—Russell E. Adams
Attorney, Agent, or Firm—Louis Weinstein

[57] ABSTRACT

Apparatus for exposure control/focus adjustment for a camera comprises an exposure controlling mechanism, a focus adjusting mechanism and a source of rotary drive. The drive from the source is transmitted through a differential gearing to the exposure controlling mechanism and the focus adjusting mechanism. The differential gearing is operated such that the transmission of the drive to either one of the exposure controlling mechanism and the focus adjusting mechanism is blocked while allowing the other mechanism to be driven.

23 Claims, 14 Drawing Figures

APPARATUS FOR EXPOSURE CONTROL/FOCUS ADJUSTMENT FOR CAMERA

BACKGROUND OF THE INVENTION

The invention relates to an apparatus for exposure control/focus adjustment for a camera, and more particularly, for such apparatus in which an exposure control and a focus adjustment operation of a camera is driven from a single rotating drive source.

An apparatus for exposure control/focus adjustment for a camera is disclosed, for example, in Japanese Laid-Open Patent Application No. 93,409/1985 in which part of an exposure controlling cam which drives the exposure control is formed with a detent for engaging with a focus adjusting mechanism so that a focus adjustment can be performed by simultaneously locking the focus adjusting mechanism and stopping the rotating drive source, and the detection of rotation of the drive source is switched subsequently to shift from the focus adjustment to the exposure control operation, followed by returning the exposure controlling cam to its initial position.

In such an apparatus, the rotating drive source must be stopped temporarily when shifting from the focus adjustment to the exposure control operation in order to reverse the direction of rotation. This requires a certain length of time until the drive source can respond, resulting in a long time lag from a shutter release to the actual initiation of an exposure process. Accordingly, a rotating drive source having a faster response is required, presenting a problem in respect of the increased expense of a camera. Another problem results that a compelx electrical circuit is required for controlling the rotation of the drive source in the forward and the reverse direction.

SUMMARY OF THE INVENTION

The above problems are overcome in accordance with the invention, which has for its object the provision of an apparatus for exposure control/focus adjustment for camera which avoids an increased expense for a rotating drive source and which avoids a complex electrical circuit usually required for controlling the rotation of the drive source.

The apparatus according to the invention comprises an exposure control mechanism, a focus adjustment mechanism and a rotating drive source. The drive source rotates in one direction, and a driving force therefrom is selectively transmitted to the exposure control mechanism and focus adjusting mechanism through a differential gearing. In addition, the apparatus comprises drive force transmission means which selectively blocks the transmission of the driving force to either one of the exposure control mechanism and the focus adjustment mechanism while permitting the other to be driven. As a result, a motor which exhibits a poor response may be used without causing a degradation in the exposure control/focus adjustment of a camera, thus enabling a reduction in the cost required. In addition, since a unidirectionally rotating drive source may be used for the control, the motor may be replaced by a drive source of different type such as a power spring, improving the flexibility in the design. In this manner, an inexpensive apparatus for exposure control/focus adjustment for camera can be provided without causing any degradation in the performance.

DETAILED DESCRIPTION OF PREFERRED EMBODIMENTS

Figure 1:
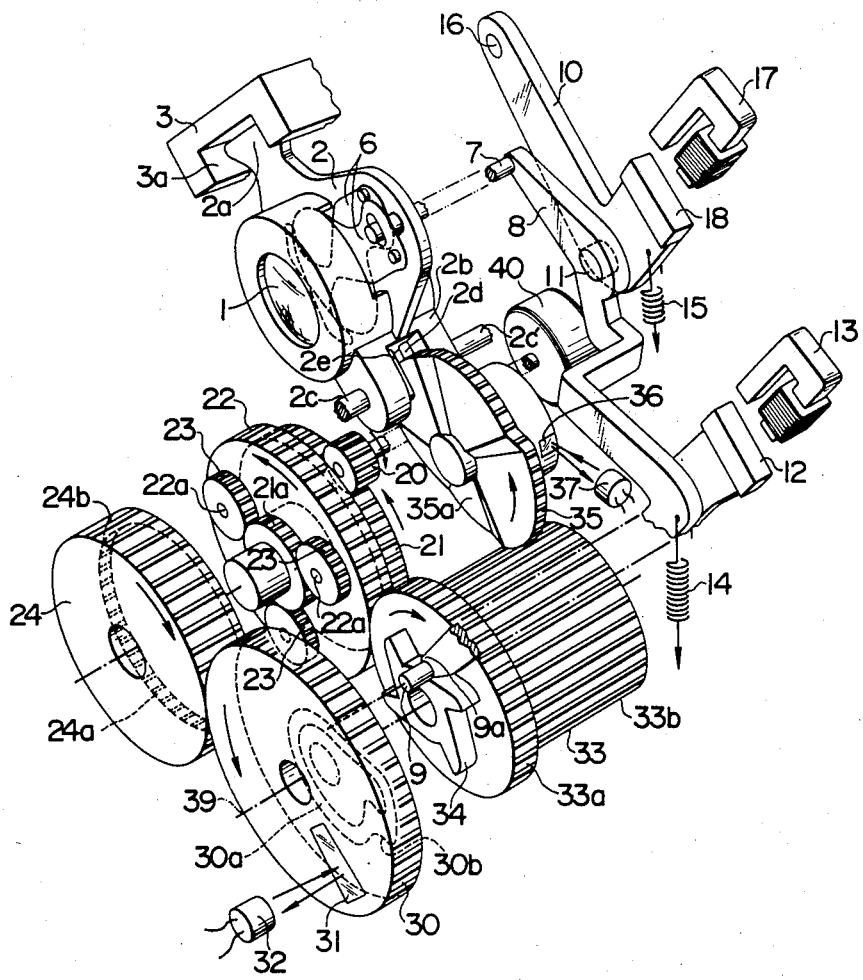
FIG. 1 is an exploded, perspective view, to an enlarged scale, of an essential part of an apparatus for exposure control/focus adjustment for camera according to one embodiment of the invention.

FIG. 1 shows a first embodiment of the invention in which a taking lens 1 is fixedly mounted in a lens barrel 2 by means of a holding sleeve. The lens barrel 2 is disposed so as to be movable from a nearest focal position of the lens 1 to an infinity position along the optical axis of the taking lens. Specifically, at its one end, the lens barrel 2 is formed with a tab 2a which is fitted in a guide groove 3a formed in a rotational stop 3 formed on a stationary member while the other end of the lens barrel is formed with a forked portion 2b having a pair of guide pins 2c, 2c' extending in a direction parallel to the optical axis and which are slidably fitted in guide openings formed in a stationary member, not shown, so that the lens barrel serves as a means for guiding a movement of the taking lens 1 in the direction of the optical axis.

The lens barrel 2 is provided with a pair of sector blades defining a shutter of vario type and which are mounted on a sector opening and closing pin 7 which is fitted in an associated opening. The fully open position and the fully closed position of the shutter are defined by stops, not shown. The sector opening and closing pin 7 is fixedly mounted on the free end of one arm of an open/close lever 8, the other arm of which is folded to extend downwardly, with its free end fixedly carrying an automatic exposure (hereafter abbreviated as AE) drive pin 9. At a location intermediate its length, the lever 8 has a fulcrum which is pivotally mounted on a pin 11 which is fixedly mounted at the bend of a support arm 10 which is in turn rotatably mounted on a pin 16 at its one end. At the bend of the other arm of the lever 8 nearest the free end, the arm is formed with an armature 12 which is adapted to be held attracted by a solenoid 13. This bend of the other arm of the lever 8 is engaged by one end of a spring 14, which urges the lever 8 to rotate clockwise about the fulcrum 11. Another spring 15 is engaged with the support arm 10 toward its free end and urges the support arm 10 to rotate clockwise about the pin 16. It is to be understood that the support pin 16 is fixedly mounted on a stationary member (not shown). The free end of the support arm 10 has an armature 18 secured thereto, which is adapted to be attracted by another solenoid 17. Toward the base end, the AE drive pin 9 which is secured to the lever 8 is formed with an abutment 9a (see FIGS. 2A to 2E) which is arranged for engagement with an automatic focus (hereafter abbreviated as AF) cam stop 34.

On the other hand, a motor 40 represents a drive source for performing the exposure control/focus adjustment operation of a camera, and a rotating drive therefrom is transmitted to a reduction gearing. Specifically, an output gear 20 is fixedly mounted on the output shaft of the motor 40, and meshes with a gear 21 of a larger diameter, the boss of which is integrally formed with a gear 21a of a smaller diameter. A gear 22 of a larger diameter is rotatably disposed around the boss. The gear 21a is formed so as to project from the front surface of the large diameter gear 22, and meshes with planet gears 23 which are rotatably mounted on three support shafts 22a, which are in turn fixedly mounted on the front surface of the gear 22 at equi-angular intervals. The three planet gears 23 mesh with the internal teeth 24a of an internally toothed gear 24, which also carries external teeth 24b formed around its periphery which is in meshing engagement with an AE cam gear 30.

Figure 3:
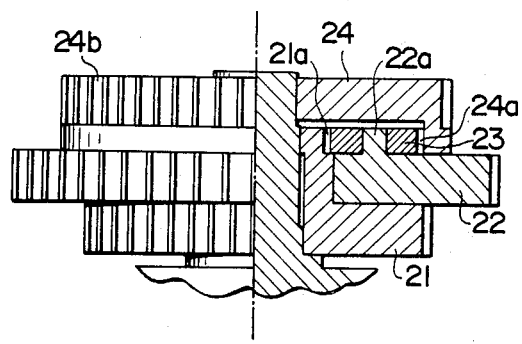
FIG. 3 is a side elevation, partly in section, of differential gearing transmission means used in the apparatus of the embodiment.

The operation of the differential gearing, which represents the drive force transmission means, will now be described with reference to the cross section shown in FIG. 3. Referring to FIG. 3, the rotation of the gear 21 is transmitted to the planet gears 23 through the gear 21a of a smaller diameter. If the gear 22 is constrained from rotating, the planet gears 23 rotate about support shafts 22a, thus causing the internal gear 24 to rotate. On the other hand, if the internal gear 24 is constrained from rotating, the planet gears 23 revolve around the smaller diameter gear 21a, which then acts as a sun gear, along the internal teeth 24a of the internal gear 24 while rotating themselves about the support shafts 22a. Accordingly, the support shafts 22a also move with the planet gears 23, causing the large diameter gear 22 to rotate.

Figure 4:
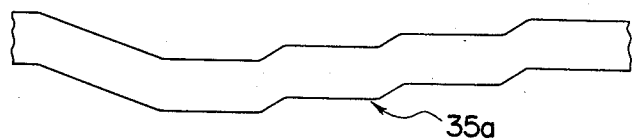
FIG. 4 is a developed view of an active cam surface on an AF gear used in the apparatus of the embodiment.

Returning to FIG. 1, in its rear surface, the AE cam gear 30 is formed with an AE cam 30a which is shaped as an endless or closed loop groove in which the drive pin 9 is fitted to serve as a cam follower, and the AE cam groove is partly formed with a detent portion 30b. In its front surface, the AE cam gear 30 is formed with a reflective pattern 31 which is used for controlling the initial position and which is disposed in opposing relationship with a photo-reflector 32. The AE cam gear 30 is rotatably mounted on a shaft 39, on which is also rotatably mounted an AF cam gear 33. The AF cam gear 33 comprises a forwardly located, thin-walled front gear 33a and a rearwardly located, thick-walled rear gear 33b. The front gear 33a meshes with the gear 22 in the differential gearing, and an AF cam stop 34 is mounted on the front surface of the gear 33a. The rear gear 33b meshes with an AF gear 35, part of which is held between a pair of projections 2d, 2e which are disposed inside the forked portion 2b of the lens barrel 2. On both of its lateral surfaces, the AF gear 35 is formed with an AF drive step cam 35a including four steps in order to control the distance to an object being photographed in a first to a fourth zone, for example, as indicated in FIG. 4. A reflective pattern 36 is formed on part of the peripheral surface of the boss of the AF gear 35 for detecting the rotational position thereof to thereby control the initial position thereof, and a photo-reflector 37 is disposed so as to be capable of detecting the reflective pattern 36.

The apparatus of the invention constructed in the manner mentioned above operates as follows: Initially, as the motor 40 is set in motion, the output gear 20 rotates, accompanied by the rotation of the gear 21 of a larger diameter and the gear 21a of a smaller diameter in one direction. The rotation of the gear 21 is transmitted through the gear 21a, the planet gears 23 to the internal gear 24. At this time, the gear 22 of a larger diameter is prevented from rotating as a result of an increased load formed by the AF gear 35 having the stepped cam 35a contained in the focus adjustment mechanism and the lens barrel 2 which carries the taking lens. Accordingly, the rotation of the larger diameter gear 21 and the smaller diameter gear 21a is entirely transmitted to the internal gear 24. The rotation of the internal gear 24 is transmitted to the AE cam gear 30. On the other hand, when the internal gear 24 is prevented from rotating, the revolution of the planet gears 23 causes the rotation of the larger diameter gear 21 and the smaller diameter gear 21a to be entirely transmitted to the larger diameter gear 22, the rotation of which is in turn transmitted to the AF cam stop 34 and the AF gear 35 through the front gear 33a of the AF cam gear 33.

Figure 5:
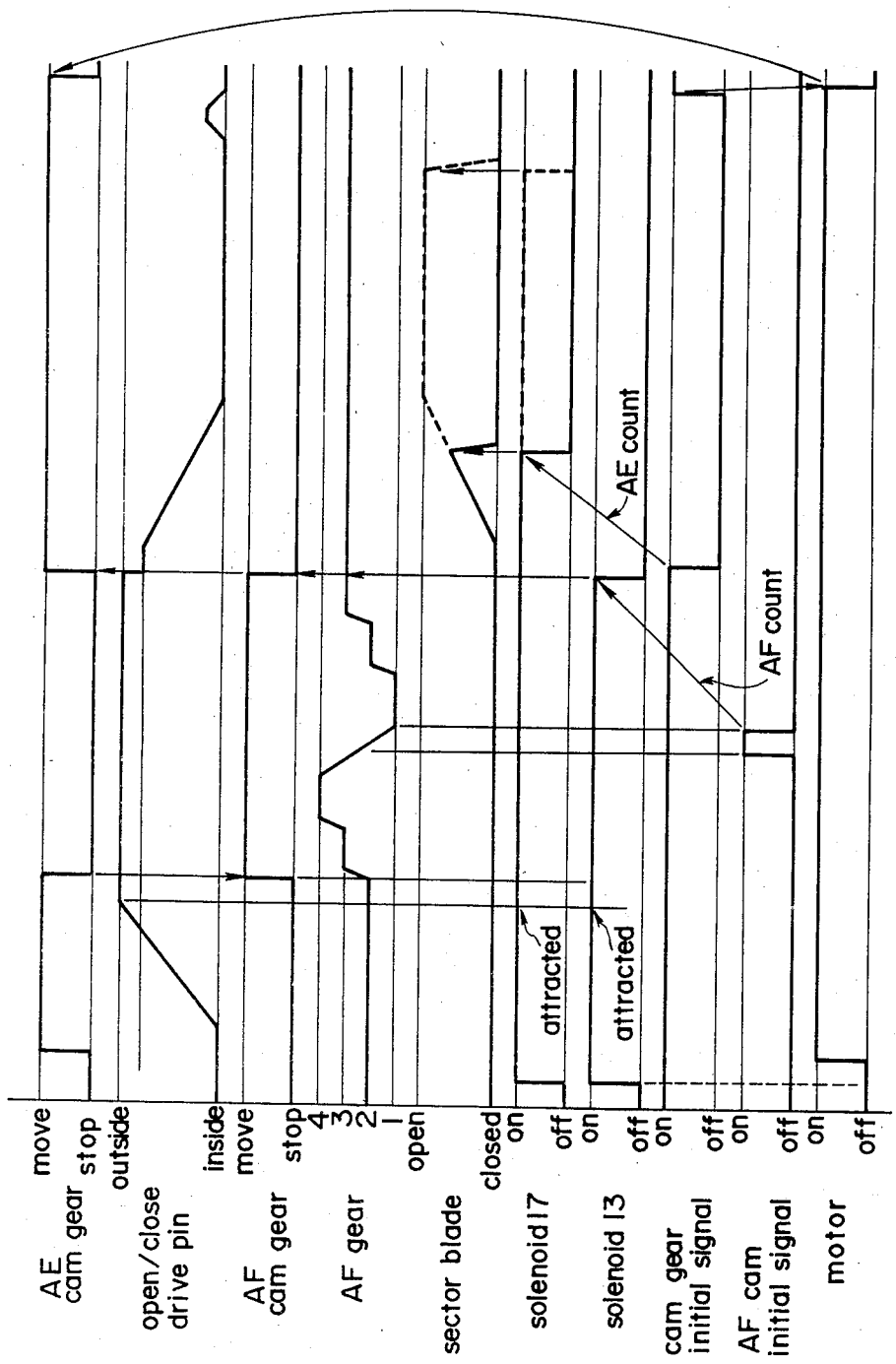
FIG. 5 is a series of timing charts illustrating the operation of the apparatus.

On the other hand, the solenoids 13, 17 are energized immediately before the motor 40 is driven, as indicated by the timing charts of FIG. 5, but the armatures 12, 18 have not yet been displaced and accordingly, the support arm 10 has been rotated clockwise about the support pin 16 under the resilience of the spring 15, thus allowing the entire open/close lever 8 to be displaced downward through the support pin 11. The sector blades 6 are constructed such that they are open when the open/close pin 7 is located upward and are closed when the pin is located downward, and hence the sector blades 6 remain closed under the condition mentioned above.

Figure 2A:
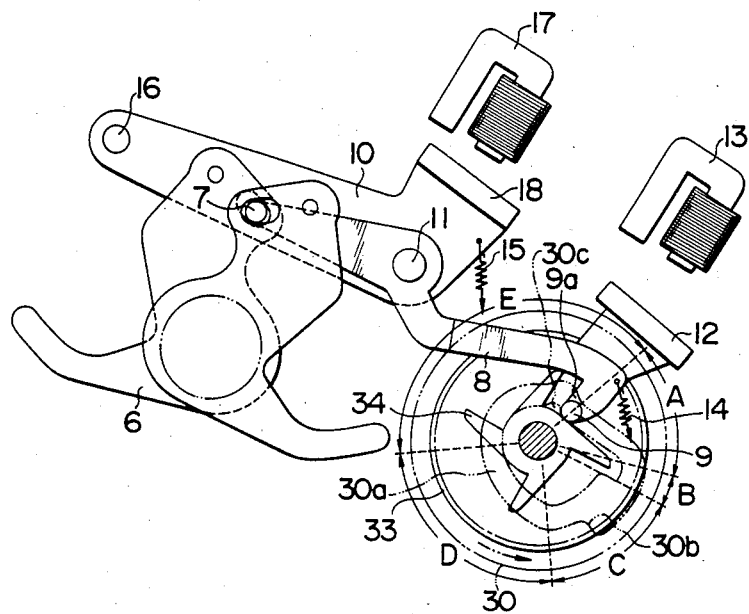
FIGS. 2A to 2E are front views of an essential part of the apparatus of the embodiment illustrating various phases of operation.

Under such initial condition, the AE drive pin 9 remains at rest adjacent to the end position within the AE cam groove 30a, as indicated in FIG. 2A. When the motor 40 is driven under the initial condition illustrated in FIG. 2A, the gear 22 of a larger diameter undergoes little rotation while the internal gear 24 rotates alone since the load presented by the AF cam gear 33 is high as compared with the load presented by the AE cam gear 30. If the load on the internal gear 24 increases to permit a slight rotation of the AF cam gear 33, the abutment 9a on the free end of the other arm of the open/close lever 8 bears against the detent on the AF cam stop 34, thus inhibiting the rotation of the AF cam gear 33. Thus, the gear 22 which meshes with the front gear 33a of the AF cam gear 33 does not rotate while allowing the internal gear 24 to rotate alone. Since the internal gear 24 meshes with the AE cam gear 30, the latter rotates counter-clockwise, moving the cam groove 30a in the sequence of operational zones A→B→C→D→E.

Figure 2B:
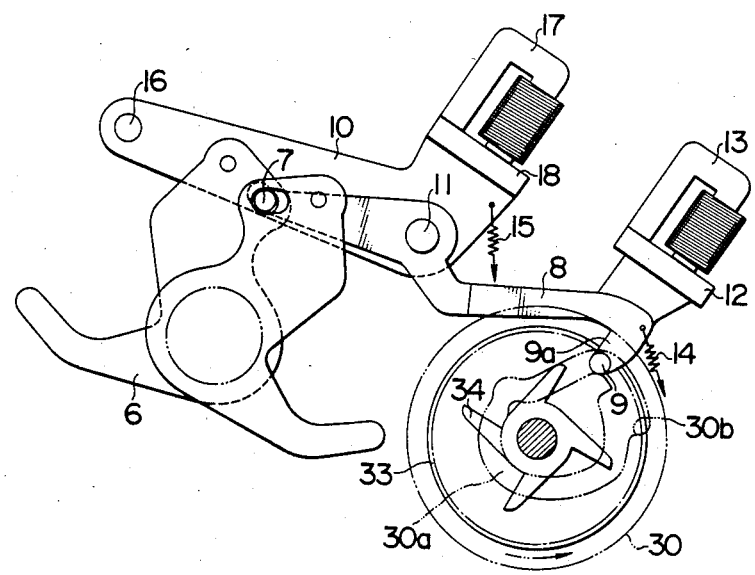

Initially in the zone A, the AE cam groove 30a is effective to push the AE drive pin 9 on the open/close lever 8 upward, as indicated in FIG. 2B. As the pin 9 is raised, the open/close pin 7 is prevented from moving further downward, whereby the lever 8 rotates counter-clockwise about the fulcrum defined by the pin 7. Accordingly, the support pin 11 also moves upward, causing the support arm 10 to rotate counter-clockwise about the support pin 16 against the resilience of the spring 15.

The counter-clockwise rotation of the lever 8 causes the abutment 9a to be disengaged from the AF cam stop 34. However, it will be seen that the AE cam gear 30 will be only slightly loaded in an amount which is required to drive the sector blades 6 and to charge the open/close lever 8 and the support arm 10 while the AF cam gear 33 has a greater load imposed thereon which is required to drive the lens barrel 2, so that the AF cam gear 33 undergoes little rotation, allowing the AE cam gear 30 to continue its rotation. At the end of the zone A, the armatures 12, 18 are held attracted by the solenoids 13, 17.

In the zone B, the open/close lever 8 and the support arm 10 are maintained such that the armatures 12, 18 are held attracted by the solenoids 13, 17 in a firm manner.

Figure 2C:
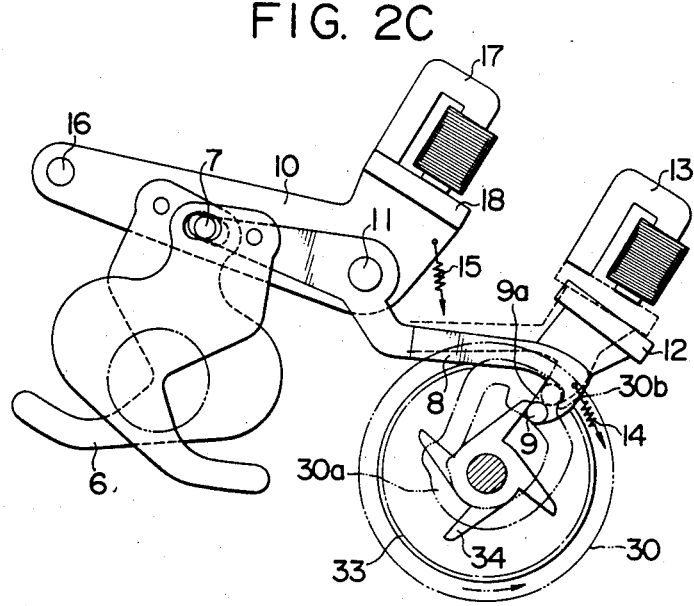

In the zone C, the AE drive pin 9 bears against the detent portion 30b to block the rotation of the AE cam gear 30, as indicated in broken lines in FIG. 2C. The rotational drive from the differential gearing is now transmitted to the AF cam gear 33, which then begins to rotate. As the gear 33 rotates, the photo-reflector 37 detects the reflective pattern 36, thus deriving a signal representing the initial position of the AF gear 35. An electrical circuit, not shown, counts a time interval which passes since this initial position. The solenoid 13 is deenergized when a time interval has passed which corresponds to the number of steps in the step cam 35a of the AF gear 35 in response to a signal which is derived from an AF mechanism, not shown. Thereupon, the open/close lever 8 rotates clockwise about the support pin 11 under the tension of the spring 14, and the AE drive pin 9 then remains at its lower position. The AF cam gear 33 is constrained from rotating by the abutment of the AF cam stop 34 against the abutment 9a if the AF cam gear 33 rotates through a small stroke under the influence of the inertia after the drive pin 9 has been disengaged from the detent portion 30b. The AF gear 35 may be stopped at a position corresponding to the cam step derived from the AF mechanism if the gear ratio of the AF gear 35 and the AF cam gear 33 is chosen such that as the cam on the AF cam stop 34 moves relative to the abutment 9a by an amount corresponding to one step, the step cam 35a formed on the end face of the AF gear 35 moves through an amount corresponding to one step, thereby causing the projections 2e, 2d on the forked portion 2b to move the lens barrel 2 by an amount corresponding to one step in the direction of the optical axis. In this manner, the projections 2d, 2e on the forked portion 2b of the lens barrel 2 hold the cam step of the AF gear 35 therebetween during its movement, whereby the lens barrel 2 moves in the direction of the optical axis by an amount corresponding to a change in the cam step of the AF gear 35 for purpose of focus adjustment.

As mentioned previously, the sector blades 6 are open when the open/close pin 7 moves upward and are closed when the pin moves downward. Accordingly, when the AE drive pin 9 moves to its lower position, the open/close pin 7 moves upward or in a direction to open the sector blades 6, but the resulting movement remains within a margin of overlap of the sector blades 6, which therefore remains closed. When the drive pin 9 moves downward and is disengaged from the detent portion 30b, the AE cam gear 30 begins its rotation again, whereby an exposure period begins to be counted by an electrical circuit, not shown.

Figure 2D:
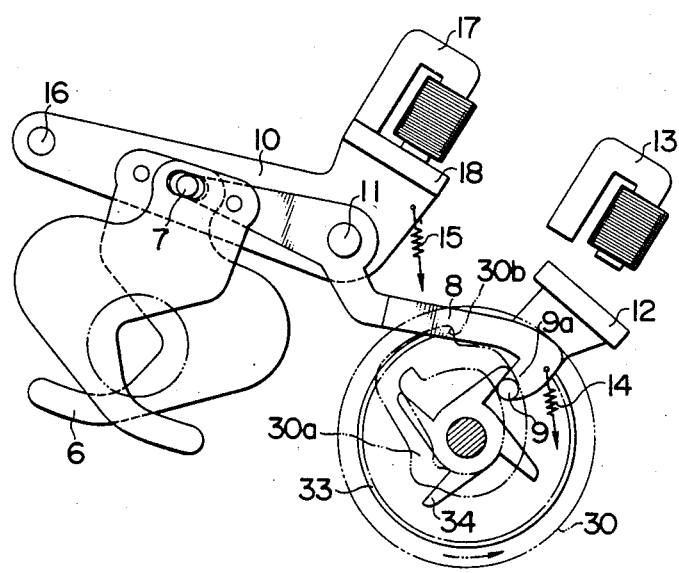

In the zone D, the AE drive pin 9 moves along the cam groove 30a, as indicated in FIG. 2D, whereby the open/close lever 8 rotates clockwise about the pin 11, thus causing the pin 7 to move upward to allow the sector blades 6 to begin opening.

Figure 2E:
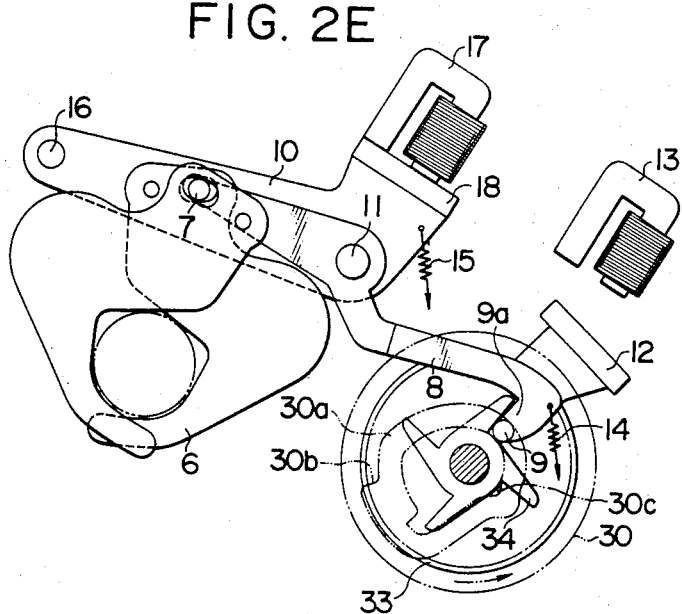

In the zone E, the sector blades 6 define an open aperture, as indicated in FIG. 2E, which is then maintained. The solenoid 17 is deenergized when a proper exposure period has passed during the time the zone D or zone E is reached. Thereupon, the support arm 10 rotates clockwise about the pin 16 under the tension of the spring 15, and this causes the open/close lever 8 to be driven downward by the pin 11, rotating counter-clockwise about the AE drive pin 9, whereby the open/close pin 7 is effective to drive the sector blades 6 for closing motion to close the sector blades 6. In the event a proper exposure is not reached when the longest exposure period has passed, the solenoid 17 is deenergized at such time, thus forcing the closing movement of the sector blades 6. The longest exposure period is chosen such that the position which the AE drive pin 9 assumes within the AE cam groove 30a at this time is located nearer the zone D than a raised portion 30c which is disposed close to the end of the zone E.

A continued rotation of the motor causes the pin 9 to move past the raised portion 30c, whereby it reaches the terminal end of the zone E. This terminal position of the AE cam gear 30 is detected by the photo-reflector 32, deenergizing the motor 40 to complete a series of photographing operations.

The purpose of the raised portion 30c is to prevent an unintended rotation of the AE cam gear 30 in the clockwise direction in response to external shocks when the apparatus is being prepared to taking a picture.

Referring to the series of timing charts shown in FIG. 5 for added description, the conditions illustrated correspond to the completion of the previous photographing operation which has taken place at the second step of the automatic focus and another photographing operation is to begin. Specifically, the solenoids 13, 17 are energized in response to the depression of a release button, followed by the rotation of the motor 40. The rotation of the AE cam gear 30 which results from the rotation of the motor 40 accompanies a movement of the open/close drive pin 9 along the cam groove 30a from inside to the outside, so that the armatures 12, 18 mounted on one end of the open/close lever 8 and the support arm 10 are held attracted by the solenoids 13, 17. When the drive pin 9 abuts against the detent portion 30b of the cam groove 30a to block a further rotation of the AE cam gear 30, the AF cam gear 33 rotates, and the photo-reflector 37 detects the reflective pattern 36 to derive a signal representing the initial position. At this time, the AF gear 35 starts from the second step, which corresponds to the previous photographing position, and returns to the first step after passing through the third and the fourth step. The time interval which passes since the signal indicating the initial position is counted by an electrical circuit, not shown, to provide an AF count. When an object to be photographed is located in the third step, the AF gear 35 assumes the condition shown. When a time interval passes which corresponds to the third step, the solenoid 13 is deenergized, and the drive pin 9 is disengaged from the detent portion 30b of the cam groove 30a to move down, whereby the AF cam stop 34 abuts against the abutment 9a, thus blocking a further rotation of the AF cam gear 33.

Subsequently, the AE cam gear 30 rotates again, and an AE count or exposure period is counted by an electrical circuit, not shown. When a proper exposure period has passed, the solenoid 17 is deenergized to close the sector blades 6. If the proper exposure period exceeds the longest exposure period, the solenoid 17 is also deenergized, thus forcibly closing the sector blades 6. The final position of the AE cam gear 30 is detected by the photo-reflector 32, whereupon the motor 40 is brought to a stop, thus completing the series of photographing operations.

Figure 6:
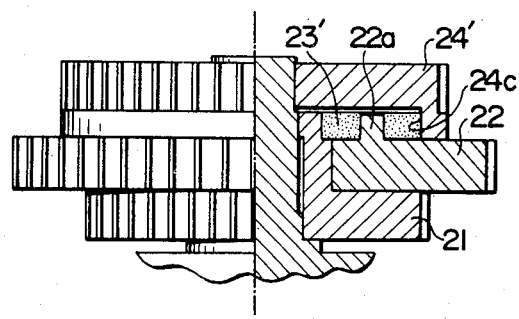
FIG. 6 is a side elevation, partly in section, of a modification of the differential gearing which may be used in the apparatus of the embodiment.

The invention is not limited to the embodiment described above, but alternative arrangements may also be employed. By way of example, FIG. 6 shows a gear 24' formed with a frictional member 24c which is substituted for the internal gear 24a in the differential gearing, with the planet gear 23 being replaced by a friction wheel 23'.

In the described embodiment, the AE cam gear 30 is locked only when the AF cam gear 33 is to be driven, by utilizing the fact that the load on the AF cam gear 33 is greater than the load on the AE cam gear 30. Four stops 34 are disposed on the AF cam gear 33 so that any inadvertent movement of the AF cam gear 33 during the operation of the AE cam gear 30 cannot cause an unstable rotational speed of the AE cam gear 30, by locking the AF cam gear 33 with these stops to stop it positively. However, the stops 34 can be dispensed with if the load on the AF cam gear 33 is chosen sufficiently greater than the load on the AE cam gear 30.

Figure 7:
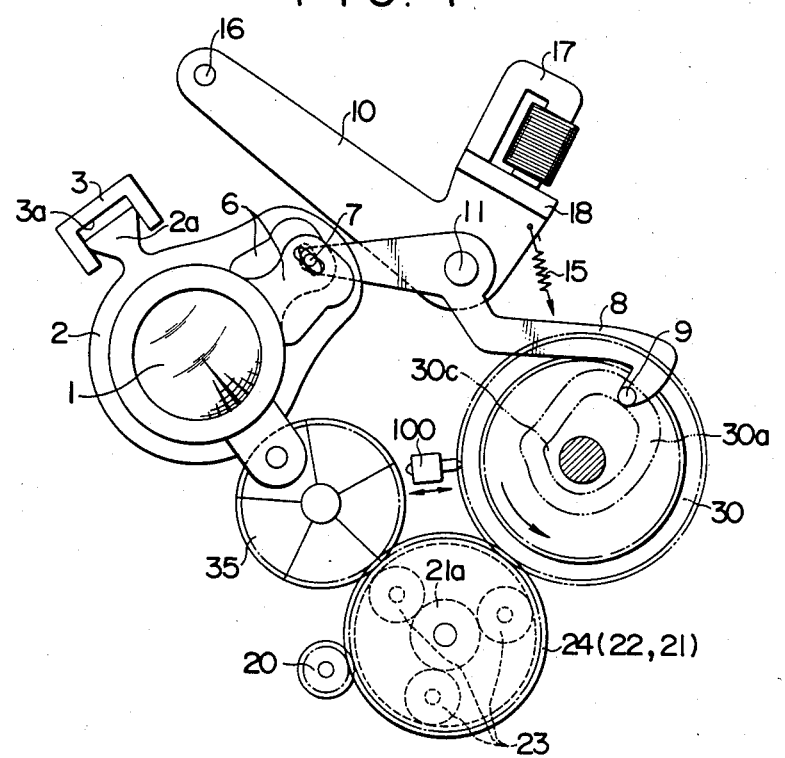
FIG. 7 is a front view of an essential part of an apparatus for exposure control/focus adjustment according to another embodiment of the invention.

FIG. 7 shows a second embodiment of the invention, and it is noted that similar parts to those described above in connection with the first embodiment will not be described again. In this embodiment, the AF gear 35 directly meshes with the gear 22 of a larger diameter, which represents one of output gears of the differential gearing while the AE cam gear 30 meshes with the internal gear 24 which represents the other output gear. A ratchet which is driven by a bistable solenoid 100 is interposed between the AE cam gear 30 and the AF gear 35 for alternately engaging with or being disengaged from the teeth of the AE cam gear 30 and the AF gear 35. The AE cam groove 30a formed in the AE cam gear 30 corresponds to the AE cam groove 30a of the first embodiment from which the detent portion 30b is removed, as shown in FIG. 7. The AE drive pin 9 on the lever 8 which opens or closes the sector blades 6 fits in the AE cam groove 30a.

The operation of this embodiment will now be described. At the initial position, the drive pin 9 is located where it has slightly moved past the raised portion 30c which is disposed adjacent to the terminal end of the AE cam groove 30a. When a release button, not shown, is operated, the motor is set in motion, and the output gear 20 fixedly mounted on the output shaft thereof begins to rotate. During the initial phase, the solenoid 100 has its claw engaged with the tooth surface of the AF gear 35 to lock it against rotation, whereby the differential gearing causes the internal gear 24 to rotate while rotating the AE cam gear 30 counter-clockwise. The drive pin 9 moves along the cam groove 30a during such rotation, causing the support arm 10 to rotate counter-clockwise about the pin 16 against the resilience of the spring 15, allowing the armature 18 mounted on one end of the support arm 10 to be held attracted by the solenoid 17. After having completed the operation to hold the armature attracted, the solenoid 100 now disengages the AF gear 35 and locks the AE cam gear 30. Thereupon the rotation of the motor is transmitted through the gear 22 of a larger diameter to the AF gear 35, and when the lens barrel 2 is driven to a given position which is determined by the AF mechanism, the solenoid 100 is activated again to unlock the AE cam gear 30 while engaging the AF gear 35, thus ceasing to move the lens barrel 2.

The AE cam gear 30 again rotates counter-clockwise, and the drive pin 9 is progressively guided along the cam groove 30a toward the center of the AE cam gear 30. The resulting movement of the drive pin 9 causes the lever 8 to rotate clockwise about the fulcrum 11, thus opening the sector blades 6. The holding action by the solenoid 17 is released after a given time interval, allowing the support arm 10 to rotate clockwise under the resilience of the spring 15 to move the fulcrum 11 downward, thus causing the sector blades 6 to be closed rapidly. The AE cam gear 30 further rotates counter-clockwise, and when the drive pin 9 has moved past the raised portion 30c, the energization of the motor is interrupted, thus returning to the initial condition.

Figure 8:
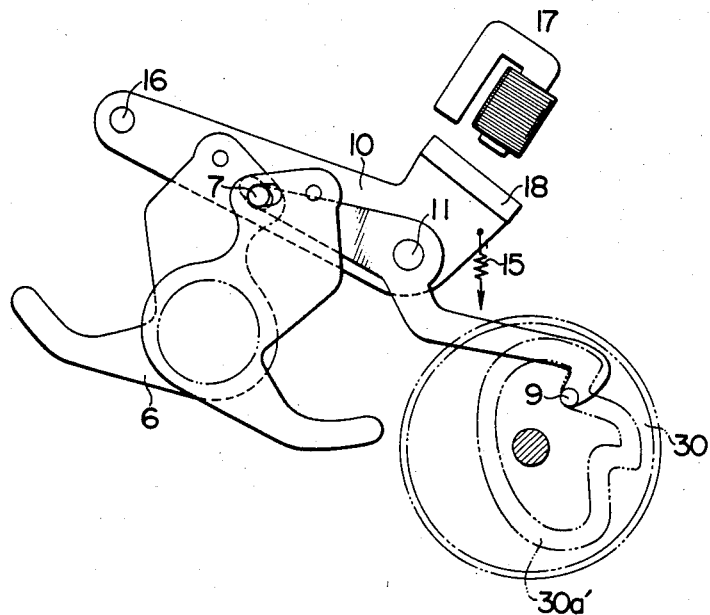
FIG. 8 is a front view of an essential part of an apparatus for exposure control/focus adjustment according to a further embodiment of the invention.
Figure 9:
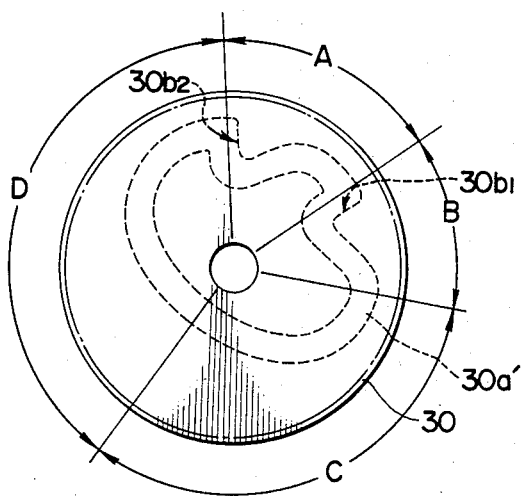
FIG. 9 is a front view of an AE cam gear shown in FIG. 8, specifically illustrating a cam groove formed therein.
Figure 10:
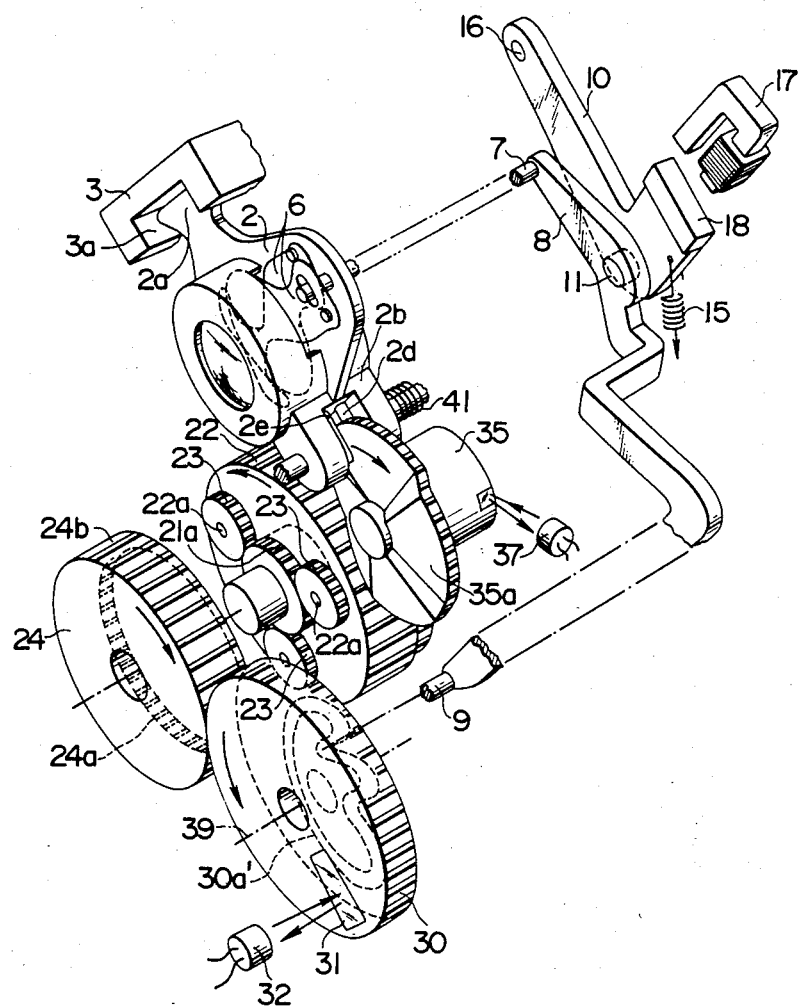
FIG. 10 is an exploded perspective view, to an enlarged scale, of an essential part of the apparatus shown in FIG. 8.

Referring to FIGS. 8 to 10, a third embodiment of the invention will be described. It is to be noted that similar parts to those described in connection with the first embodiment are designated by like reference characters without repeating their detailed description. The output gear 20 of the motor meshes with the differential gearing which comprises the gears 21, 22, 23 and 24 in the similar manner as in the first embodiment. The internal gear 24, which represents one of the output gears of the differential gearing, meshes with the AE cam gear 30 which has a cam groove 30a' formed in its lateral side, into which is fitted the AE drive pin 9 formed on the free end of the open/close lever 8 for operating the sector blades 6 in interlocked relationship with the rotation of the AE cam gear 30. The other output gear of the differential gearing meshes with the AF gear 35 which is defined in the form of a step cam in a manner similar to the first embodiment. The lens barrel 2 is urged against the AF gear 35 through a spring 41 which acts upon a projection 2d thereon, whereby it is driven in the direction of the optical axis by a step cam 35a on the AF cam gear 30 for the purpose of focus adjustment. It is to be noted that the AF gear 35 is constructed so that it exhibits a sufficiently greater load as compared with the AE cam gear 30 so that during the operation of the differential gear, only the AE cam gear 30 rotates without causing any movement of the AF gear 35 unless the AE cam gear 30 is forcedly locked. The AE cam groove 30a' will now be described with reference to FIGS. 8 and 9. The location which drive pin 9 assumes in FIG. 9 represents the initial position, while the zone A shown in FIG. 9 represents the zone in which the distance from the center increases. A detent 30b1 for the drive pin 9 is formed at the terminal position of this zone so as to extend toward the center. The zone A is followed by a zone B in which the distance from the center increases again. Then follow a zone C which gradually approches the center and a zone D where it moves away from the center. A detent 30b2 is also formed at the terminal position of the zone D so as to extend toward the center.

The operation of this embodiment will now be described. When a release button, not shown, is depressed at the initial position, the motor is set in motion to rotate the gears 21, 21a in directions indicated by arrows. As mentioned previously, the AF gear 35 presents a sufficiently greater load than the AE cam gear 30, so that only the AE cam gear 30 rotates in a direction indicated by an arrow. As it rotates, the drive pin 9 is carried therewith through the zone A of the cam groove 30a' to rotate the support arm 10 counter-clockwise about the pin 16, allowing the armature 18 to be held attracted by the solenoid 17. The AE cam gear 30 is inhibited from further rotation by the abutment of the drive pin 9 against the detent 30b1 at the terminal end of the zone A, whereupon the AF gear 35 rotates in a direction indicated by an arrow. When the AF gear 35 rotates, the step cam 35a on the AF gear 35 causes the lens barrel 2 to be moved from its nearest position toward its infinity position, and when it has reached a proper position, the solenoid 17 is deenergized in response to a signal from an AF mechanism, not shown. This terminates the AF operation. The support arm 10 is caused to rotate clockwise under the tension of the spring 15, causing the drive pin 9 to be moved toward the center of the cam groove 30a', releasing the locking of the AE cam gear 30 which has been achieved by the drive pin 9 and the detent 30b1. Consequently, the AF gear 35 comes to a stop while the AE cam 30 rotates again. In the zone B, the drive pin 9 is guided in a direction away from the center, again allowing the armature 18 to be held attracted by the solenoid 17. The AE cam gear 30 further rotates, and causes the drive pin 9 to be gradually moved toward the center in the zone C. However, since the support arm 10 is held attracted by the solenoid 17, only the open/close lever 8 rotates clockwise. Consequently, the sector blades 6 begin to open, performing an exposure of the film.

The current flow through the solenoid 17 is interrupted upon a proper exposure being reached which is indicated by a photometric circuit, not shown, whereby the armature 18 is released from the solenoid 17. The support arm 10 is urged to rotate clockwise by the spring 15, and the movement of the fulcrum 11 causes the open/close lever 8 to be rotated counter-clockwise about the drive pin 9, thus rapidly closing the sector blades 6.

The AE cam gear 30 further rotates, and in the zone B, it causes the open/close lever 8 to be rotated counter-clockwise about the open/close pin 7, thus allowing the support arm 10 to be rotated counter-clockwise to allow the armature 18 to be again held by the solenoid 17. The drive pin 9 abuts against the detent 30b2 at the terminal end of the zone D, whereupon the AE cam gear 30 is inhibited from further rotation while the AF gear 35 begins to rotate. When the AF gear 35 returns to its initial position, the photoreflector 37 detects this and deenergizes the solenoid 17, thus allowing the armature 18 to be released and causing the motor to stop.

What is claimed is:

1. Apparatus for exposure control/focus adjustment for a camera comprising:
   an exposure controlling mechanism for controlling the amount of incident light which passes through a taking lens for the purpose of taking a picture;
   a focus adjusting mechanism for properly controlling the distance to an object being photographed;
   a source of rotary drive continuously operating throughout the performance of the exposure control/focus operations for operating the exposure controlling mechanism and the focus adjusting mechanism; and
   drive transmission means for transmitting the rotary drive from the source to the exposure controlling mechanism and the focus adjusting mechanism through a differential gearing and for selectively driving either one of the mechanisms responsive to changes in the load upon the exposure controlling mechanism and the focus adjusting mechanism.

2. Apparatus according to claim 1 in which the focus adjusting mechanism comprises a lens barrel which carries a taking lens, a forked portion integrally formed with the lens barrel, an automatic focus gear held between the forks of the forked portion and including a disc-shaped step cam which causes the lens barrel to be moved in the direction of the optical axis through the forked portion as it rotates, and an automatic focus cam gear disposed in meshing engagement with the automatic focus gear and disposed for rotation in one direction in response to the transmission of rotating drive through the differential gearing.

3. Apparatus according to claim 1 in which the exposure controlling mechanism comprises a shutter which opens or closes a taking optical path, an open/close pin for operating the shutter for opening or closing movement, an open/close lever on which the open/close pin is fixedly mounted and disposed for rocking motion, a solenoid for displacing the open/close lever to its inoperative position during the focus adjustment, and an automatic exposure gear to which rotating drive is transmitted through the differential gearing for rotation in one direction, the automatic exposure gear including an automatic exposure cam groove which causes a rocking motion of the open/close lever.

4. Apparatus according to claim 3 in which the shutter comprises a vario-type shutter including a pair of sector blades.

5. Apparatus according to claim 3 in which the automatic exposure cam groove which is formed in the automatic exposure gear is in the form of a closed loop, endless groove in which a drive pin mounted on the open/close lever is fitted to serve as a cam follower, the automatic exposure cam groove being partly formed with a detent portion which blocks a rotation of the automatic exposure gear by cooperation of the drive pin with a cam stop which is integrally formed on the automatic focus cam gear.

6. Apparatus according to claim 1 in which the transmission of the drive to the focus adjusting mechanism is interrupted by a load presented by the automatic focus gear having a step cam in the focus adjusting mechanism and the lens barrel carrying the taking lens and which is greater than that presented by the exposure controlling mechanism.

7. Apparatus according to claim 1 in which said differential gearing comprises a sun gear driven by said rotary drive source, a large diameter gear mounted for rotation about the axis of rotation of the sun gear, a plurality of planet gears rotatably mounted on the axis of the large diameter gear for meshing with the sun gear and an internally toothed gear having internal teeth which mesh with the planet gears, said internally toothed gear and said large diameter gear being output gears.

8. Apparatus according to claim 7 in which said internally toothed gear drives the exposure controlling mechanism and said large diameter gear drives the focus adjusting mechanism.

9. Apparatus according to claim 1 in which said focus adjusting mechanism comprises a cam portion for moving a taking lens in the direction of the optical axis for focussing and a stop member having a plurality of detent portions which interrupt operation of the focus adjusting mechanism by allowing any of the detent portions to be locked when the focus adjusting operation is completed.

10. Apparatus according to claim 9 in which said cam portion is a disc-shaped step cam having portions thereof which are displaced from one another in the direction of the optical axis.

11. Apparatus according to claim 1 in which the exposure controlling mechanism comprises a shutter which selectively opens and closes a taking optical path, an open/close pin for operating the shutter for opening or closing movement, an open/close lever on which the open/close pin is fixedly mounted and disposed for rocking motion, and an automatic exposure gear to which rotating drive is transmitted through the differential gearing for rotation in one direction, the automatic exposure gear including an automatic exposure cam means which causes a rocking motion of the open/close lever.

12. Apparatus according to claim 11 in which the automatic exposure cam means comprises a cam groove provided on the automatic exposure gear and formed in the shape of a closed loop endless groove;
    said open/close lever having a drive pin which serves as a cam follower and slidably moves within said closed loop endless groove.

13. Apparatus to claim 11 in which the automatic exposure cam means comprises a cam formed in the shape of a closed loop endless cam;
    said open/close lever having a cam follower slidably engaging said closed loop endless cam.

14. Apparatus according to claim 12 in which at least one portio of said cam groove acts as a detent portion for interrupting rotation of the automatic exposure gear with the cooperation of the drive pin.

15. Apparatus according to claim 1 in which the transmission of drive to the focus adjusting mechanism is interrupted by a load change presented by an automatic focus gear in the focus adjusting mechanism and the lens barrel carrying the taking lens and which load is greater than that presented by the exposure controlling mechanism.

16. Apparatus according to claim 10 further comprising marking means associated with said step cam and means for sensing said marking means to control the initial positioning of said step cam.

17. Apparatus according to claim 10 in which the rotation interrupting means of the exposure controlling mechanism comprises a detent member for locking rotation of the exposure controlling apparatus, operative means for moving the detent member to its locking position and an electromagnet for holding the detent member at this non-locking position.

18. Apparatus according to claim 1 wherein said rotary drive source rotates in only direction.

19. Apparatus for exposure control/focus adjustment for a camera comprising:
    an exposure controlling mechanism for controlling the amount of incident light which passes through a taking lens for the purpose of taking a picture;
    a focus adjusting mechanism for properly controlling the distance to an object being photographed;
    a source of rotary drive for operating the exposure controlling mechanism and the focus adjusting mechanism; and
    drive transmission means for transmitting the rotary drive from the source to the exposure controlling mechanism and the focus adjusting mechanism through a differential gearing and for selectively driving either one of the mechanisms responsive to changes in the load upon the exposure controlling mechanism and the focus adjusting mechanism;
    said differential gearing comprising a gear of large diameter disposed for meshing engagement with an output gear which rotates in one direction and to which a rotating drive from the source is transmitted, a second gear of a large diameter rotatably disposed around a gear of a small diameter which is coaxially and integrally mounted with the first mentioned gear, a plurality of planet gears rotatably mounted on a plurality of support shafts which are fixedly mounted on one side of the second gear at equal angular intervals and disposed for meshing engagement with the gear of a small diameter, and an internal gear having internal teeth which are disposed for meshing engagement with the planet gears.

20. Apparatus for exposure control/focus adjustment for a cameral having an adjustable taking lens and a shutter mechanism, comprising:
    an exposure controlling mechanism operating the shutter mechanism to control the amount of incident light which passes through the taking lens;
    a focus adjusting mechanism operating the taking lens responsive to the distance between the camera and an object being photographed;
    a drive source having an output which continuously moves in a given direction during the exposure control/focus operation for operating the exposure controlling mechanism and the focus adjusting mechanism;
    a differential gear mechanism for selectively coupling drive from the drive source to the exposure controlling mechanism and the focus adjusting mechanism; and
    a solenoid for interrupting operation of one of the exposure controlling mechanism and the focus adjusting mechanism by selectively interconnecting only of said exposure control and focus adjusting elements to the drive means.

21. Apparatus for exposure control/focus adjustment for a camera comprising:
    an exposure controlling mechanism for controlling he amount of incident light which passes through a taking lens;
    a focus adjusting mechanism for properly controlling the distance to an object being photographed;
    a drive source having an output which continuously moves in a given direction during the exposure control/focus operation for operating both the exposure controlling mechanism and the focus adjusting mechanism; and a differential gear mechanism for selectively transmitting drive from the drive source to the exposure controlling mechanism and the focus adjusting mechanism; rotation interrupting means being provided only on the exposure controlling mechanism and a load for the focus adjusting mechanism undergoing a change sufficient to cause the differential gear mechanism to drive the exposure controlling mechanism when the rotation interrupting means is inoperative.

22. Apparatus according to claim 21 wherein said drive source is operated throughout the exposure control/focus adjustment operations.

23. Apparatus for exposure control/focus adjustment for a camera comprising:

an exposure control mechanism for controlling the amount of incident light passing through a taking lens provided in the camera;

a focus adjusting mechanism for adjusting the taking lens of the camera responsive to the distance between the camera and an object being photographed;

a single drive source continuously operating in a given direction during the exposure control/focus control operation for selectively operating the exposure controlling mechanism and the focus adjusting mechanism;

differential gear means coupled between said drive source and said focus adjusting mechanism and said exposure controlling mechanism and responsive to a change in the load imposed by one of the aforesaid mechanism upon said differential gear mechanism for causing the differential gear mechanism to terminate driving energy to the mechanism whose load has significantly changed and for delivering the drive to the remaining one of said mechanisms.

* * * * *

UNITED STATES PATENT AND TRADEMARK OFFICE
CERTIFICATE OF CORRECTION

PATENT NO. : 4,728,979

DATED : March 1, 1988

INVENTOR(S) : Hiroshi Akitake; Toshimasa Akagi; Gouichi Hiratsuka; Tatsuya Suzuki It is certified that error appears in the above-identified patent and that said Letters Patent is hereby corrected as shown below:

IN THE SPECIFICATION:

Column 1, line 43, after "for" insert --a--.

IN THE CLAIMS:

Column 10, Claim 1, line 4, after "for" insert --selectively--

Column 10, Claim 5, line 46, delete "a" (second occurrence).

Column 11, Claim 13, line 34, after "Apparatus" insert --according--.

Column 11, Claim 14, line 40, change "portio" to --portion--.

Column 12, Claim 20, line 49, after "only" insert --one--.

Column 12, Claim 21, line 53, change "he" to --the--.

Signed and Sealed this

Sixth Day of June, 1989

Attest:

DONALD J. QUIGG

Attesting Officer

Commissioner of Patents and Trademarks